United States Patent
Jansson

(10) Patent No.: US 11,866,013 B2
(45) Date of Patent: Jan. 9, 2024

(54) SUSTAINABLE WASHER FLUID SUPPLY FOR A VEHICLE

(71) Applicant: Volvo Car Corporation, Gothenburg (SE)

(72) Inventor: Claes Jansson, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 137 days.

(21) Appl. No.: 17/123,251

(22) Filed: Dec. 16, 2020

(65) Prior Publication Data

US 2021/0188217 A1    Jun. 24, 2021

Related U.S. Application Data

(60) Provisional application No. 62/951,228, filed on Dec. 20, 2019.

(51) Int. Cl.
    *B60S 1/50*  (2006.01)
    *B60H 1/00*  (2006.01)
    *B60H 1/32*  (2006.01)

(52) U.S. Cl.
    CPC ............ *B60S 1/50* (2013.01); *B60H 1/00571* (2013.01); *B60H 1/32331* (2019.05)

(58) Field of Classification Search
    CPC ............ B60H 1/00571; B60H 1/3233; B60H 1/32331; B60H 1/00271; B60S 1/46; B60S 1/48; B60S 1/50
    See application file for complete search history.

(56) References Cited

U.S. PATENT DOCUMENTS

| | | | | | |
|---|---|---|---|---|---|
| 5,261,254 | A | * | 11/1993 | Cattane | B60H 1/32331 15/250.1 |
| 5,651,259 | A | * | 7/1997 | Twyman | B60S 1/50 62/93 |
| 2007/0084228 | A1 | * | 4/2007 | Heck | B60H 1/32331 62/285 |
| 2015/0027158 | A1 | * | 1/2015 | Ahmad | B60S 1/50 62/288 |
| 2019/0291665 | A1 | * | 9/2019 | Martin | B60L 58/12 |
| 2020/0122691 | A1 | * | 4/2020 | Werner | B60S 1/52 |

FOREIGN PATENT DOCUMENTS

| | | | | | |
|---|---|---|---|---|---|
| DE | 102010048845 | A1 | * | 4/2012 | ......... B60H 1/3233 |
| EP | 1481829 | A2 | * | 12/2004 | ......... B60H 1/3233 |
| WO | WO-2017115221 | A1 | * | 7/2017 | |
| WO | WO-2018189019 | A1 | * | 10/2018 | ............. B60S 1/481 |

OTHER PUBLICATIONS

Machine translation of DE102010048845 (Year: 2012).*

* cited by examiner

*Primary Examiner* — Joseph F Trpisovsky
(74) *Attorney, Agent, or Firm* — Clements Bernard Walker; Christopher L. Bernard

(57) ABSTRACT

The present disclosure redirects unused condensed liquid water from the HVAC system to the washer fluid system such that the washer fluid tank, which may be relatively small and light, does not have to be topped-off frequently. The washer fluid tank is constantly refilled, and the washer fluid supply does not have to be replenished with clean drinking water as often, preserving this important environmental resource. Vehicle sensor data and/or a mobile application usage algorithm control filling of the washer fluid tank, and optionally periodically add anti-freeze from an adjacent reservoir when necessary to maintain an operable washer fluid system even below 0 degrees C.

20 Claims, 4 Drawing Sheets

SUSTAINABLE WASHER FLUID SUPPLY FOR A VEHICLE

CROSS-REFERENCE TO RELATED APPLICATION

The present disclosure claims the benefit of priority of U.S. Provisional Patent Application No. 62/951,228, filed on Dec. 20, 2019, and entitled "SUSTAINABLE WASHER FLUID SUPPLY FOR A VEHICLE," the contents of which are incorporated in full by reference herein.

TECHNICAL FIELD

The present disclosure relates generally to the automotive field. More particularly, the present disclosure relates to a sustainable washer fluid supply for a vehicle, utilizing condensation from an HVAC (heating, ventilation, and air conditioning) system of the vehicle. The present disclosure finds particular applicability to autonomous vehicles that require a reliable washer fluid supply to clean external optical sensors and the like.

BACKGROUND

When air passes through the HVAC system of a vehicle, air humidity condenses to liquid water when it passes through the cold heat exchanger. Today, this liquid water is simply drained away as waste. Depending on the HVAC system settings, the outside temperature, and the air humidity, a typical amount of liquid water that condenses from the HVAC system is around 0.5 L per hour or per 100 km of driving distance.

All vehicles require washer fluid for periodically cleaning the windshield, rear window, and potentially lights of debris and film. In autonomous vehicles, this need is particularly acute, as the external optical sensors and the like must also be cleaned periodically. To ensure a high level of autonomous functionality and safety, these external optical sensors and the like require a large volume of washer fluid in various weather conditions and traffic situations. As a result, such vehicles having a relatively small washer fluid tank must be filled frequently, or a relatively larger and heavier washer fluid tank must be used. The result is inconvenience and the sacrificing a premium vehicle experience, or unwanted weight gain and decreased fuel efficiency.

Thus, what is still needed in the art is a vehicle that has a sustainable washer fluid supply that essentially replenishes itself to a degree, eliminating the need for a relatively large and heavy washer fluid tank or frequent topping-off.

SUMMARY

The present disclosure advantageously redirects unused condensed liquid water from the HVAC system to the washer fluid system such that the washer fluid tank, which may be relatively small and light, does not have to be topped-off frequently. The washer fluid tank is constantly refilled, and the washer fluid supply does not have to be replenished with clean drinking water as often, preserving this important environmental resource. Vehicle sensor data and/or a mobile application usage algorithm control filling of the washer fluid tank, and optionally periodically add anti-freeze from an adjacent reservoir when necessary to maintain an operable washer fluid system even below 0 degrees C. For example, the driver may be provided with expected washer fluid duration/range information based on collected historical and current usage rate data.

In one exemplary embodiment, the present disclosure provides a washer fluid system for a vehicle, including: a washer fluid tank adapted to contain a volume of washer fluid; and a conduit adapted to fluidly couple an HVAC system of the vehicle to the washer fluid tank and deliver condensed liquid water from the HVAC system to the washer fluid tank.

In embodiments, the washer fluid system further includes an fluid reservoir disposed adjacent and fluidly coupled, via a conduit, to the washer fluid tank and adapted to selectively deliver a fluid from the fluid reservoir to the volume of washer fluid contained in the washer fluid tank. Optionally, the fluid reservoir comprises a fluid level sensor operable for determining a level of the fluid contained in the fluid reservoir. And optionally, the washer fluid system further includes a washer fluid pump fluidly coupled to the washer fluid tank and adapted to deliver washer fluid from the washer fluid tank to one or more nozzles disposed in washer fluid spray locations about the vehicle via a nozzle conduit and a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles.

In embodiments, the washer fluid system further includes a washer fluid pump fluidly coupled to the washer fluid tank and adapted to deliver washer fluid from the washer fluid tank to one or more nozzles disposed in washer fluid spray locations about the vehicle via a nozzle conduit. Optionally, the washer fluid system further includes a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles.

In embodiments, the washer fluid system further includes one or more of a freezing point sensor and a washer fluid level sensor operable for determining a freezing point and a level of the volume of washer fluid contained in the washer fluid tank, respectively.

In embodiments, the washer fluid system further includes a vehicle ECU operable for monitoring, controlling, and reporting the status of the washer fluid system. Optionally, the washer fluid system further includes an ambient temperature sensor coupled to the vehicle ECU. And optionally, the vehicle ECU is further operable for reporting the status of the washer fluid system to and receiving user instructions from one or more of a driver information module, a mobile application, and a cloud network via one or more or a wired and a wireless communications link.

In another exemplary embodiment, the present disclosure provides a method for sustaining a washer fluid system for a vehicle. The method includes providing a washer fluid tank adapted to contain a volume of washer fluid. The method also includes delivering condensed liquid water from an HVAC system of the vehicle to the washer fluid tank via a conduit adapted to fluidly couple the HVAC system to the washer fluid tank.

In embodiments, the method further includes providing a fluid reservoir disposed adjacent and fluidly coupled via a reservoir conduit to the washer fluid tank and adapted to selectively deliver a fluid from the fluid reservoir to the volume of washer fluid contained in the washer fluid tank. Optionally, the fluid reservoir comprises a fluid level sensor operable for determining a level of the fluid contained in the fluid reservoir. And optionally, the method yet further includes providing a washer fluid pump fluidly coupled to the washer fluid tank and adapted to deliver washer fluid from the washer fluid tank to one or more nozzles disposed in washer fluid spray locations about the vehicle via a nozzle conduit and a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles.

In embodiments, the method further includes providing a washer fluid pump fluidly coupled to the washer fluid tank and adapted to deliver washer fluid from the washer fluid tank to one or more nozzles disposed in washer fluid spray locations about the vehicle. Optionally, the method yet further includes providing a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles.

In embodiments, the washer fluid tank includes one or more of a freezing point sensor and a washer fluid level sensor operable for determining a freezing point and a level of the volume of washer fluid contained in the washer fluid tank, respectively.

In embodiments, the method further includes providing a vehicle ECU operable for monitoring, controlling, and reporting the status of the washer system. Optionally, the method yet further includes providing an ambient temperature sensor coupled to the vehicle ECU. And optionally, the vehicle ECU is further operable for reporting the status of the washer fluid system to and receiving user instructions from one or more of a driver information module, a mobile application, and a cloud network via one or more or a wired and a wireless communications link.

In a further exemplary embodiment, the present disclosure provides a system for a vehicle. The system includes an HVAC system, a washer fluid tank, and a conduit. The HVAC system is adapted for cooling and heating a vehicle cabin. The washer fluid tank is adapted to contain a volume of washer fluid. The conduit fluidly couples the HVAC system to the washer fluid tank and adapted to deliver liquid water condensed by the HVAC system to the washer fluid tank.

In embodiments, the system further includes a fluid reservoir fluidly coupled, via a reservoir conduit, to the washer fluid tank and adapted to selectively deliver a fluid from the fluid reservoir to the volume of washer fluid contained in the washer fluid tank.

In embodiments, the system further includes a washer fluid pump and a fluid injector. The washer fluid pump is fluidly coupled to the washer fluid tank and adapted to deliver washer fluid from the washer fluid tank to one or more nozzles disposed in washer fluid spray locations about the vehicle via a nozzle conduit. The fluid injector is disposed between the washer fluid pump and the one or more nozzles, the fluid injector adapted to inject a fluid contained therein into the nozzle conduit to mix the fluid from the fluid injector with the washer fluid outgoing to the one or more nozzles.

BRIEF DESCRIPTION OF THE DRAWINGS

The present disclosure is illustrated and described with reference to the various drawings, in which like reference numbers are used to denote like system components/method steps, as appropriate, and in which.

DESCRIPTION OF EMBODIMENTS

Again, the present disclosure advantageously redirects unused condensed liquid water from the HVAC system to the washer fluid system such that the washer fluid tank, which may be relatively small and light, does not have to be manually topped-off frequently. The washer fluid tank is constantly refilled, and the washer fluid supply does not have to be replenished with clean drinking water as often, preserving this important environmental resource. Vehicle sensor data and/or a mobile application usage algorithm control filling of the washer fluid tank, and optionally periodically add a fluid, such as anti-freeze or concentrated washer fluid, from an adjacent reservoir when necessary to maintain an operable washer fluid system even below 0 degrees C. or to maintain an acceptable concentration of the washer fluid for dispensing to the washer nozzles. For example, the driver may be provided with expected washer fluid duration/range information based on collected historical and current usage rate data.

Figure 1:
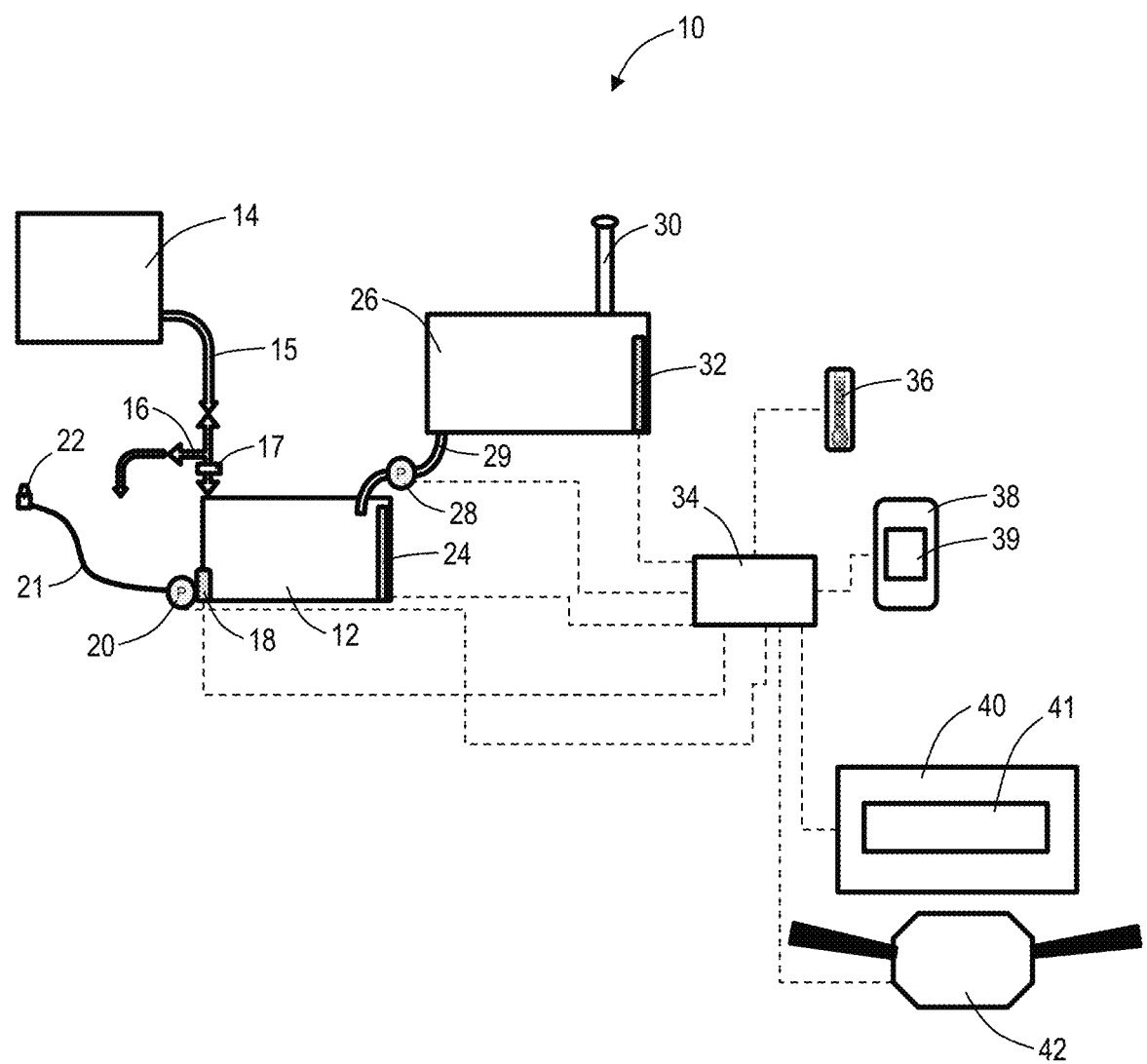
FIG. 1 is a schematic diagram illustrating one exemplary embodiment of the washer fluid system of the present disclosure, including the applicable HVAC system connections and monitoring/control systems.

Referring now specifically to FIG. 1, in one exemplary embodiment, the washer fluid system 10 includes a washer fluid tank 12 that is fluidly coupled to the HVAC system 14 of the associated vehicle, such that condensed liquid water from the HVAC system 14 is directed to the washer fluid tank 12. In embodiments, the fluid coupling is via a conduit 15, such as tubing, hosing, or piping. In order to prevent the condensed liquid water from backing up into the drainage components of the HVAC system 14, an overflow outlet 16 is provided near the top of the washer fluid tank 12, providing an escape means for extra water in the washer fluid tank 12. In the embodiment illustrated, the overflow outlet 16 is provided along the conduit 15, such as branching off of the conduit 15. The washer fluid can include water, detergent, glass cleaner, anti-freeze, and combinations thereof.

In embodiments, a filter 17 is positioned along the conduit 15 and is adapted to prevent debris that may have entered the HVAC system 14 from flowing with the condensed liquid and into the washer fluid tank 12. In the embodiment illustrated, the filter 17 is positioned downstream of the overflow outlet 16. However, in other embodiments, the filter 17 is positioned at or upstream of the overflow outlet 16. In embodiments, the filter is a fine mesh filter. However, other filters are also contemplated.

In embodiments, and in particular in vehicles operating in cold environments, the washer fluid tank 12 is equipped with a freezing point sensor 18 to ensure that the washer fluid does not freeze and damage the washer fluid tank 12, as well as a washer fluid pump 20 operable for selectively delivering washer fluid from the washer fluid tank 12 to the various washer fluid nozzles 22 of the vehicle via a nozzle conduit 21, such as a hose or a pipe. The washer fluid nozzles are disposed adjacent to components to be selectively wetted and cleaned. A washer fluid tank level sensor 24 is also disposed within the washer fluid tank 12, operable for detecting the washer fluid level within the washer fluid tank 12. The washer fluid tank level sensor 24 is used to give a warning to the driver if the condensed liquid water from the HVAC system 14 is insufficient and the washer fluid level becomes low, for example. In some embodiments, the washer fluid tank level sensor 24 is used to trigger the HVAC system 14 to perform a "water generation cycle" if and when the HVAC system 14 does not normally generate condensed liquid water, thereby autonomously replenishing the washer fluid tank 12.

As alluded to above, a fluid reservoir 26 is disposed adjacent to the washer fluid tank 12 and is operable for selectively dispensing fluid contained therein into the washer fluid tank 12 via a connecting conduit 29 and a fluid reservoir dispensing pump 28. As is conventional, the fluid reservoir 26 includes an associated filler pipe 30 for adding fluid to the fluid reservoir 26, as well as a fluid level sensor 32 operable for detecting the fluid level within the fluid reservoir 26.

The fluid reservoir 26 contains a concentrated washer fluid, such as concentrated glass cleaner, detergent, anti-freeze, and combinations thereof. In embodiments where the fluid reservoir 26 contains anti-freeze, when the temperature is close to, at, or below the freezing point, the fluid reservoir dispensing pump 28 dispenses concentrated anti-freeze from the fluid reservoir 26 into to the washer fluid tank 12. The freezing point sensor 18 in the washer fluid tank 12 provides a signal to the vehicle ECU 34 when extra anti-freeze is so required. In embodiments where the fluid reservoir 26 contains glass cleaner and/or detergent, the vehicle ECU 34 is configured to maintain a predetermined concentration of the washer fluid, including the glass cleaner and/or detergent, based on the amount of condensed water added to the washer fluid tank 12 and the previous level and concentration of the washer fluid. In embodiments, the amount of condensed water added to the washer fluid tank 12 is determined by the vehicle ECU based on the fluid levels detected by the washer fluid tank level sensor 24 as condensed water is added to the washer fluid tank 12 and as the washer fluid is dispensed from the fluid tank 12.

The vehicle ECU 34 is electronically coupled to and is configured to direct the operation of the washer fluid tank 12, the HVAC system 14, and the fluid reservoir 26—selectively directing the generation of condensed liquid water, monitoring all fluid levels, monitoring all fluid temperatures, etc. Accordingly, the vehicle ECU 34 is electronically coupled to the washer fluid tank freezing point sensor 18, the washer fluid tank level sensor 24, and the anti-freeze reservoir level sensor 32, as well as the HVAC system 14, the washer fluid pump 20, and the fluid reservoir dispensing pump 28. The vehicle ECU 34 is also electronically coupled to an ambient temperature sensor 36 that provides the vehicle ECU 34 with overall environmental awareness.

By applying an appropriate algorithm in the vehicle ECU 34, the washer fluid system 10 can be integrated with the rest of the vehicle systems, with input from/output to the vehicle navigation system, and an external device 38, such as a mobile phone, that includes a mobile application and/or a cloud application configured to provide external information to the vehicle ECU 34. With this integration, the vehicle ECU 34 can get information on the current ambient temperature, the weather forecast along a planned route (regardless of if the vehicle is driven by the driver or is in autonomous mode) or in the area were the vehicle is normally driven, etc. With this information, the washer fluid tank 12 may be anticipatorily filled with washer fluid and with sufficient anti-freeze to enable cleaning of the windshield, window(s), lights, cameras, sensors, etc., while also ensuring that the washer fluid in the washer fluid tank 12 does not freeze.

In some embodiments, besides controlling the freezing point and fluid level responses in the washer fluid system 10, the vehicle ECU 34 is also configured to provide useful information to the driver, either directly to the driver information module 40, such as via a display 41, or to the external device 38, such as in a user interface 39 of a mobile application. The information provided can be, but is not limited to:

Amount of washer fluid in the washer fluid tank 12 and fluid in the fluid reservoir 26, as well as the amount of fluid required to top either or both;

The freezing point of the current mix in the washer fluid tank 12;

The average consumption of washer fluid for the most recent mileage, as well as the predicted driving range/time until empty; and Where applicable, it can also be connected to a subscription service for refilling the required fluids before the system 10 is empty.

Figure 2:
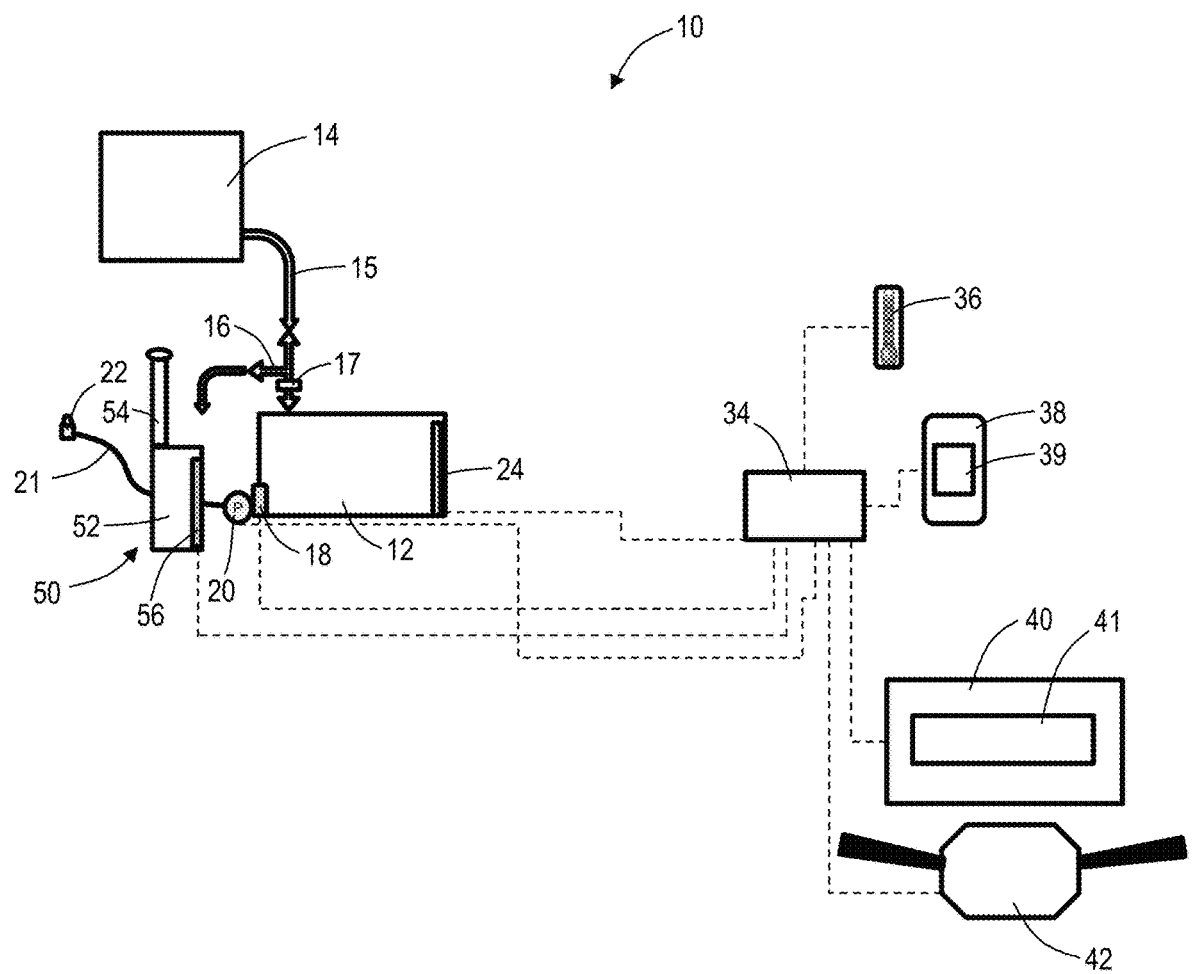
FIG. 2 is a schematic diagram illustrating another exemplary embodiment of the washer fluid system of the present disclosure, including the applicable HVAC system connections and monitoring/control systems.

Referring now to FIG. 2, in another exemplary embodiment, the washer fluid system 10 includes a fluid injector 50. The fluid injector 50 is adapted to inject a fluid into the nozzle conduit 21 to mix the fluid with the outgoing washer fluid. In embodiments, the fluid injector 50 includes an injector reservoir 52 adapted to store the fluid, an injector filler pipe 54 adapted for re-filling the injector reservoir 52, and an injector level sensor 56 adapted to monitor a fluid level of the injector reservoir 52. In embodiments, the fluid injector by the fluid injector 50 is a detergent, a concentrated washer fluid, and the like.

In the embodiment illustrated, the fluid injector 50 replaces the fluid reservoir 26. Replacing the fluid reservoir 26 with the fluid injector 50 on the outgoing nozzle conduit 21 reduces material cost, package space, and weight. This reduction includes the removal of the fluid reservoir dispensing pump 28 and the associated connecting conduit 29. The reduction in weight can help reduce emissions and/or extend driving range in electric vehicles. This particular configuration has benefits in temperate and mild climates where freezing of the washer fluid contained within the washer fluid tank 12 is not a concern and anti-freeze is not needed in the washer fluid tank 12.

Figure 3:
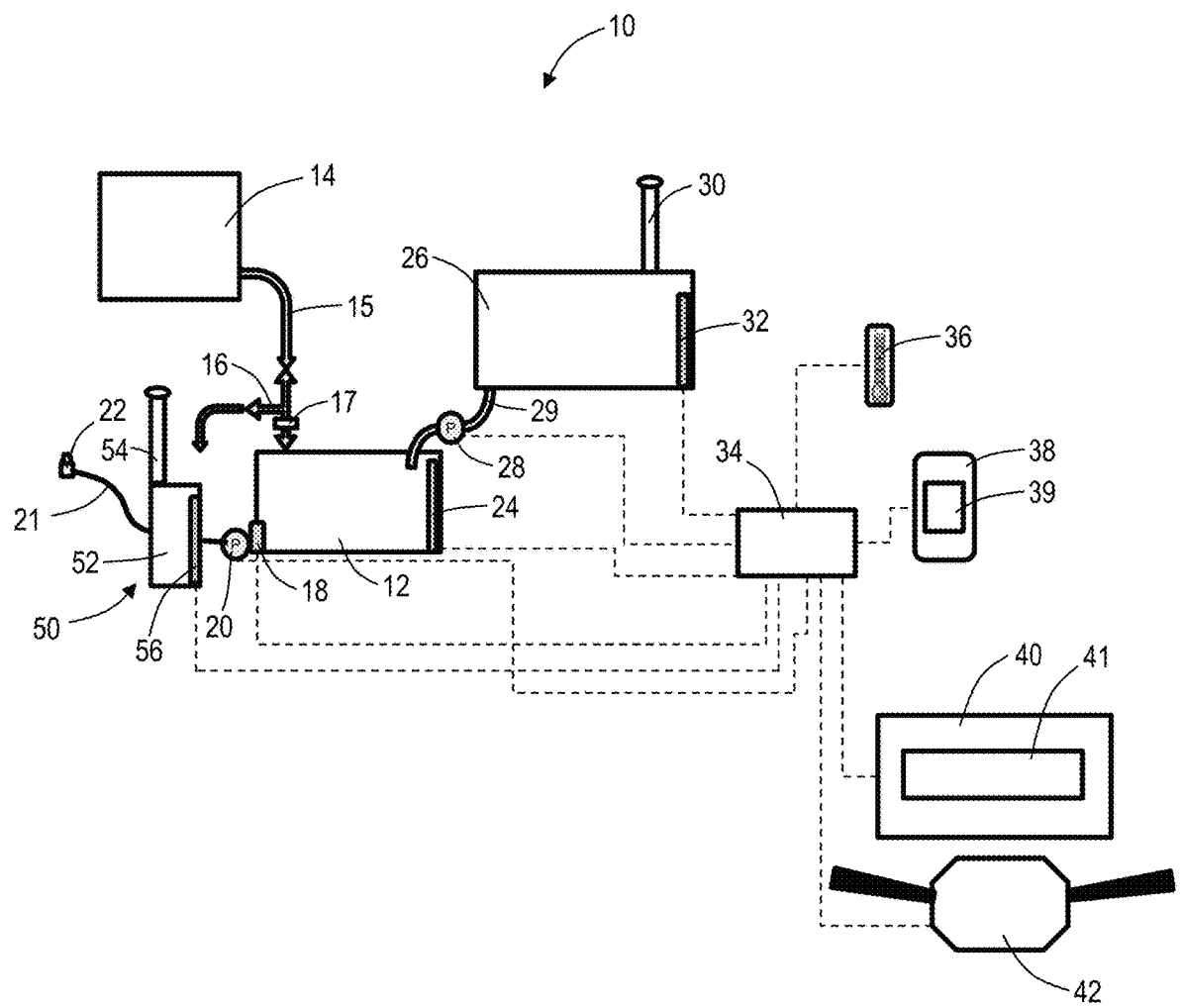
FIG. 3 is a schematic diagram illustrating a further exemplary embodiment of the washer fluid system of the present disclosure, including the applicable HVAC system connections and monitoring/control systems.

Referring now to FIG. 3, in a further exemplary embodiment, the washer fluid system 10 includes both the fluid reservoir 26 and the fluid injector 50. In this embodiment, the fluid injector 50 is adapted to inject a first fluid into the nozzle conduit 21 to mix the first fluid with the outgoing washer fluid and the fluid reservoir 26 is adapted to supply a second fluid, via the fluid reservoir dispensing pump 28, to be mixed with the condensed water in the washer fluid tank 12. For example, in one embodiment, the first fluid is a detergent/concentrated washer fluid, and the second fluid is an anti-freeze. In this configuration, the amounts of the first fluid and the second fluid can be controlled separately, and fluid such as anti-freeze can only be supplied when necessary rather than continually being supplied with the concentrated washer fluid.

With water being more and more a highly-valued necessity and sometimes limited in access, the present disclosure is eco-friendly. Water that is pulled from the air and condensed is put to beneficial use, instead of merely being discarded into the environment. The consumer does not have to use clean, drinkable tap water to fill the washer fluid system 10. Another environmental gain is that the washer fluid system 10 allows for the use of a smaller washer fluid tank 12, adding less average weight to the vehicle. With less average weight, the vehicle has lower exhaust emissions. Alternatively, the present disclosure gives a battery electric vehicle a longer driving range.

Figure 4:
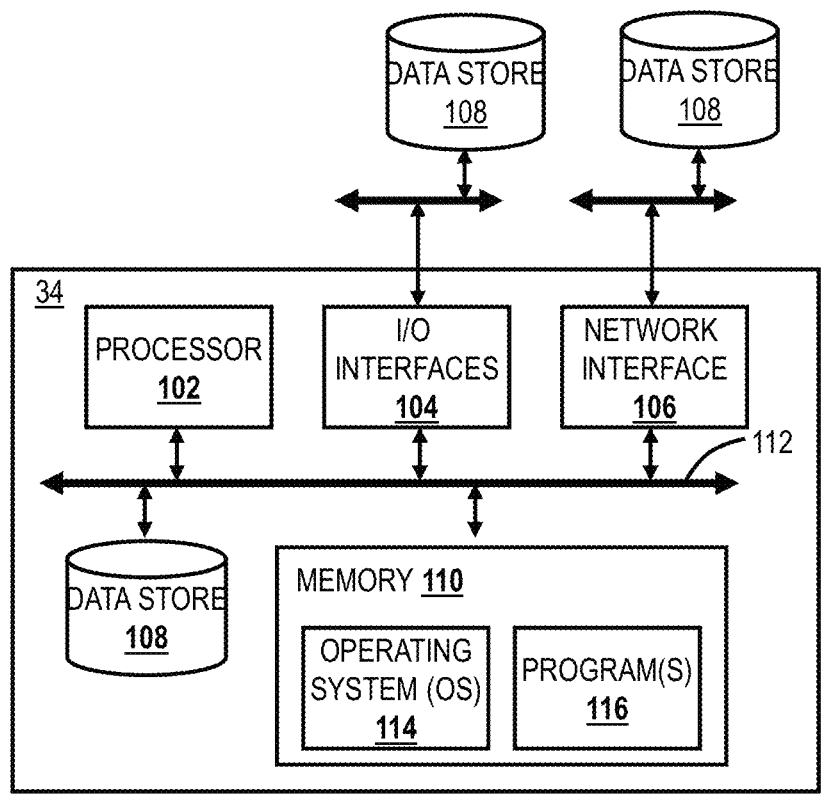
FIG. 4 is a block diagram of the Electronic Control Unit (ECU) for the washer fluid systems of FIGS. 1-3.

Referring now to FIG. 4, in embodiments, the ECU 34 and the components thereof are configured to implement control of the washer fluid system 10 of the present disclosure and as disclosed herein. While a single ECU 34 is described, multiple ECUs and other controllers with similar hardware/software configurations are also contemplated. In the embodiment illustrated, the processor 102 is a hardware device for executing software instructions embodied in a non-transitory computer-readable medium.

The processor 102 may be any custom made or commercially available processor, a central processing unit (CPU), an auxiliary processor among several processors associated with a server, a semiconductor-based microprocessor (in the form of a microchip or chipset), or generally any device for executing software instructions. When the ECU 34 is in operation, the processor 102 is configured to execute software stored within the memory 110, to communicate data to and from the memory 110, and to generally control operations of the ECU 34 pursuant to the software instructions.

I/O interfaces 104 may be used to receive user input from and/or for providing system output to one or more devices or components. A network interface 106 may be used to enable the ECU 34 to communicate on a network, such as the Internet or a Local Area Network (LAN).

The network interface 106 may include, for example, an Ethernet card or adapter (e.g., 10BaseT, Fast Ethernet, Gigabit Ethernet, or 10GbE) or a Wireless Local Area Network (WLAN) card or adapter (e.g., 802.11a/b/g/n/ac). The network interface 106 may include address, control, and/or data connections to enable appropriate communications on the network.

A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the ECU 34, such as, for example, an internal hard drive connected to the local interface 112 in the ECU 34. Additionally, in another embodiment, the data store 108 may be located external to the control system 100 such as, for example, an external hard drive connected to the I/O interfaces 104 (e.g., a SCSI or USB connection).

In a further embodiment, the data store 108 may be connected to the ECU 34 through a network, such as, for example, a network-attached file server. The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to tangible media, such as data storage media, or communication media, including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure advantageously redirects unused condensed liquid water from the HVAC system to the washer fluid system such that the washer fluid tank, which may be relatively small and light, does not have to be topped-off frequently. The washer fluid tank is constantly refilled, and the washer fluid supply does not have to be replenished with clean drinking water as often, preserving this important environmental resource. Vehicle sensor data and/or a mobile application usage algorithm control filling of the washer fluid tank, and optionally periodically add anti-freeze from an adjacent reservoir when necessary to maintain an operable washer fluid system even below 0 degrees C. For example, the driver may be provided with expected washer fluid duration/range information based on collected historical and current usage rate data. It should be noted that convention wiper controls 42 may be utilized to actuate the operability of the washer fluid system 10 to dispense washer fluid to the appropriate target(s).

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A washer fluid system for a vehicle, comprising:
 a washer fluid tank adapted to contain a volume of washer fluid;
 a conduit adapted to fluidly couple an HVAC system of the vehicle to the washer fluid tank and deliver condensed liquid water from the HVAC system to the washer fluid tank;
 a fluid reservoir disposed adjacent and fluidly coupled, via a reservoir conduit, to the washer fluid tank and adapted to selectively deliver a fluid from the fluid reservoir to the volume of washer fluid contained in the washer fluid tank;
 a washer fluid pump fluidly coupled to the washer fluid tank and adapted to deliver washer fluid from the washer fluid tank to one or more nozzles disposed in washer fluid spray locations about the vehicle via a nozzle conduit; and
 a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles,
 wherein the conduit comprises a filter adapted to prevent debris in the condensed liquid water from passing from the HVAC system to the washer fluid tank and an overflow outlet adapted to prevent the condensed liquid water from backing up into the HVAC system; and
 wherein the washer fluid tank comprises a washer fluid level sensor operable for determining a level of the volume of washer fluid contained in the washer fluid tank and triggering the HVAC system to perform a water generation cycle.

2. The washer fluid system of claim 1, wherein the washer fluid tank further comprises a freezing point sensor operable for determining a freezing point of washer fluid contained in the washer fluid tank.

3. The washer fluid system of claim 1, further comprising a vehicle ECU operable for monitoring, controlling, and reporting the status of the washer fluid system.

4. The washer fluid system of claim 3, further comprising an ambient temperature sensor coupled to the vehicle ECU.

5. The washer fluid system of claim 1, further comprising:
 an injector reservoir adapted to store the fluid injected by the fluid injector into the nozzle conduit.

6. The washer fluid system of claim 5, wherein injector reservoir is adapted to store at least one of a detergent or concentrated washer fluid.

7. The washer fluid system of claim 6, wherein the fluid reservoir is adapted to store an anti-freeze.

8. The washer fluid system of claim 7, further comprising:
 a vehicle ECU operable for controlling an amount of the anti-freeze selectively delivered from the fluid reservoir to the volume of washer fluid contained in the washer fluid tank, and
 wherein the vehicle ECU is further operable for controlling an amount of the at least one of a detergent or concentrated washer fluid injected by the fluid injector into the nozzle conduit.

9. A method for sustaining a washer fluid system for a vehicle, comprising:
 providing a washer fluid tank adapted to contain a volume of washer fluid;
 delivering condensed liquid water from an HVAC system of the vehicle to the washer fluid tank via a conduit adapted to fluidly couple the HVAC system to the washer fluid tank;
 providing a fluid reservoir disposed adjacent and fluidly coupled via a reservoir conduit to the washer fluid tank and adapted to selectively deliver a fluid from the fluid reservoir to the volume of washer fluid contained in the washer fluid tank;
 providing a washer fluid pump fluidly coupled to the washer fluid tank and adapted to deliver washer fluid from the washer fluid tank to one or more nozzles disposed in washer fluid spray locations about the vehicle; and
 providing a fluid injector disposed between the washer fluid pump and the one or more nozzles, the fluid injector adapted to inject a fluid contained therein into a nozzle conduit to mix the fluid from the fluid injector with the washer fluid outgoing to the one or more nozzles, wherein the conduit comprises a filter adapted to prevent debris in the condensed liquid water from passing from the HVAC system to the washer fluid tank and an overflow outlet adapted to prevent the condensed liquid water from backing up into the HVAC system; and wherein the washer fluid tank comprises a washer fluid level sensor operable for determining a level of the volume of washer fluid contained in the washer fluid tank and triggering the HVAC system to perform a water generation cycle.

10. The method of claim 9, wherein the washer fluid tank further comprises a freezing point sensor operable for determining a freezing point of washer fluid contained in the washer fluid tank.

11. The method of claim 9, further comprising providing a vehicle ECU operable for monitoring, controlling, and reporting the status of the washer system.

12. The method of claim 11, further comprising providing an ambient temperature sensor coupled to the vehicle ECU.

13. The method of claim 9, further comprising:

providing an injector reservoir adapted to store the fluid injected by the fluid injector into the nozzle conduit.

14. The method of claim 13, wherein the fluid reservoir is adapted to store an anti-freeze, and the injector reservoir is adapted to store at least one of a detergent or concentrated washer fluid.

15. The method of claim 14, further comprising:

providing a vehicle ECU operable for controlling an amount of the anti-freeze selectively delivered from the fluid reservoir to the volume of washer fluid contained in the washer fluid tank, and wherein the vehicle ECU is further operable for controlling an amount of the at least one of a detergent or concentrated washer fluid injected by the fluid injector into the nozzle conduit.

16. A system for a vehicle, comprising:

an HVAC system adapted for cooling and heating a vehicle cabin;

a washer fluid tank adapted to contain a volume of washer fluid;

a conduit fluidly coupling the HVAC system to the washer fluid tank and adapted to deliver liquid water condensed by the HVAC system to the washer fluid tank;

a fluid reservoir disposed adjacent and fluidly coupled, via a reservoir conduit, to the washer fluid tank and adapted to selectively deliver a fluid from the fluid reservoir to the volume of washer fluid contained in the washer fluid tank;

a washer fluid pump fluidly coupled to the washer fluid tank and adapted to deliver washer fluid from the washer fluid tank to one or more nozzles disposed in washer fluid spray locations about the vehicle via a nozzle conduit; and a fluid injector disposed between the washer fluid pump and the one or more nozzles, the fluid injector adapted to inject a fluid contained therein into the nozzle conduit to mix the fluid from the fluid injector with the washer fluid outgoing to the one or more nozzles, wherein the conduit comprises a filter adapted to prevent debris in the condensed liquid water from passing from the HVAC system to the washer fluid tank and an overflow outlet adapted to prevent the condensed liquid water from backing up into the HVAC system; and wherein the washer fluid tank comprises a washer fluid level sensor operable for determining a level of the volume of washer fluid contained in the washer fluid tank and triggering the HVAC system to perform a water generation cycle.

17. The system of claim 16, further comprising:

an injector reservoir adapted to store the fluid injected by the fluid injector into the nozzle conduit.

18. The system of claim 17, wherein the fluid reservoir is adapted to store an anti-freeze.

19. The system of claim 18, wherein the injector reservoir is adapted to store at least one of a detergent or concentrated washer fluid.

20. The system of claim 19, further comprising:

a vehicle ECU operable for controlling an amount of the anti-freeze selectively delivered from the fluid reservoir to the volume of washer fluid contained in the washer fluid tank, and wherein the vehicle ECU is further operable for controlling an amount of the at least one of a detergent or concentrated washer fluid injected by the fluid injector into the nozzle conduit.

* * * * *